United States Patent [19]
Tanaka et al.

[11] Patent Number: 6,085,000
[45] Date of Patent: Jul. 4, 2000

[54] WAVELENGTH DIVISION MULTIPLEXING OPTICAL DEVICE AND MANUFACTURING METHOD THEREFOR

[75] Inventors: Kazuhiro Tanaka; Goji Nakagawa; Youske Yamazaki; Haruhiko Tabuchi, all of Kawasaki, Japan

[73] Assignee: Fujitsu Limited, Kawasaki, Japan

[21] Appl. No.: 09/041,731

[22] Filed: Mar. 13, 1998

[30] Foreign Application Priority Data

Oct. 6, 1997 [JP] Japan ................................. 9-272733

[51] Int. Cl.⁷ .................................................. G02B 6/28
[52] U.S. Cl. ............................................ 385/45; 385/50
[58] Field of Search ................................ 385/39, 42, 45, 385/50, 51, 52

[56] References Cited

U.S. PATENT DOCUMENTS 5,732,173  3/1998  Bylander et al. .......................... 385/49

FOREIGN PATENT DOCUMENTS

| | | |
|---|---|---|
| 61-282803 | 12/1986 | Japan . |
| 63-33707 | 2/1988 | Japan . |
| 5-333222 | 12/1993 | Japan . |
| 07318751 | 12/1995 | Japan . |
| 08271742 | 10/1996 | Japan . |
| 09021912 | 1/1997 | Japan . |
| 09061664 | 3/1997 | Japan . |

*Primary Examiner*—John D. Lee
*Assistant Examiner*—Michelle R. Connelly-Cushwa

[57] ABSTRACT

A wavelength division multiplexing optical device includes a cladding layer formed on a waveguide substrate, a first optical waveguide embedded in the cladding layer, a second optical waveguide embedded in the cladding layer and connected at one end thereof to an intermediate portion of the first optical waveguide, and an insertion groove formed in the waveguide substrate and the cladding layer so as to extend across a connected portion of the first and second optical waveguides. The wavelength division multiplexing optical device further includes first and second wide grooves formed in the cladding layer so as to cover opposite end portions of the insertion groove and open to the opposite side surfaces of the cladding layer, and a wavelength selecting filter inserted in the insertion groove.

5 Claims, 10 Drawing Sheets

WAVELENGTH DIVISION MULTIPLEXING OPTICAL DEVICE AND MANUFACTURING METHOD THEREFOR

BACKGROUND OF THE INVENTION

1. Field of the Invention

The present invention relates to a wavelength division multiplexing optical device and a manufacturing method therefor.

2. Description of the Related Art

The widespread use of a communication network using optical fiber transmission is indispensable to construct a multimedia information society. It is therefore necessary to realize a photodetection module capable of efficiently converting an optical signal into an electrical signal at a low cost. Further, wavelength division multiplexing optical communication for multiplexing light having different wavelengths by utilizing wavelength independence of light to transmit the resultant wavelength division multiplexed light is expected to provide various services including bidirectional communication and service multiplexing. It is therefore essential to use a wavelength division multiplexing optical device for multiplexing optical signals having different wavelengths and/or demultiplexing wavelength division multiplexed signal light.

A conventional waveguide type wavelength division multiplexing optical device is described in Japanese Patent Laid-open No. 63-33707. In this conventional device, an optical waveguide having a Y branch portion is formed on a silicon substrate, and a groove is formed so as to extend across the Y branch portion. A dielectric multilayer film filter is inserted in this groove. This type wavelength division multiplexing optical device has a small size and good isolation characteristics, so that it is advantageous over a Mach-Zehnder type wavelength division multiplexing optical device and a fiber fusion splice type optical device.

However, the above-mentioned wavelength division multiplexing optical device structure has a problem that insertion of the filter into the groove is difficult. That is, the filter film having a thickness of about 15 $\mu$m must be inserted into the groove having a width of about 25 $\mu$m, thus making the insertion difficult. Further, to suppress an increase in insertion loss, an error of tilt angle of the filter from a vertical direction must be suppressed within about 0.5°. Accordingly, it is difficult to stably fabricate a wavelength division multiplexing optical device in the conventional structure.

SUMMARY OF THE INVENTION

It is therefore an object of the present invention to provide a wavelength division multiplexing optical device which can facilitate the insertion of the filter.

It is another object of the present invention to provide a wavelength division multiplexing optical device which can reduce insertion loss of light by providing a structure capable of inserting and maintaining the filter in perpendicular relationship to a waveguide.

In accordance with an aspect of the present invention, there is provided a wavelength division multiplexing optical device comprising a waveguide substrate; a cladding layer formed on said waveguide substrate, said cladding layer having first and second end surfaces and first and second side surfaces; a first optical waveguide embedded in said cladding layer; a second optical waveguide embedded in said cladding layer and connected at one end thereof to an intermediate portion of said first optical waveguide; an insertion groove formed in said waveguide substrate and said cladding layer between said first side surface and said second side surface so as to extend across a connected portion of said first and second optical waveguides; first and second wide grooves formed in at least said cladding layer so as to cover opposite end portions of said insertion groove and open to said first and second side surfaces of said cladding layer, respectively; and a wavelength selecting filter inserted in said insertion groove.

Preferably, the widths of the first and second wide grooves are gradually increased toward the first and second side surfaces, respectively. More preferably, a wedge is driven into the insertion groove to press the wavelength selecting filter on a wall surface defining the insertion groove.

In accordance with another aspect of the present invention, there is provided a manufacturing method for a wavelength division multiplexing optical device, comprising the steps of forming a first cladding layer on a waveguide substrate; forming a waveguide layer on said first cladding layer; etching said waveguide layer to form an optical waveguide having a Y branch portion; forming a second cladding layer on said first cladding layer so as to cover said optical waveguide; etching said first and second cladding layers to form first and second wide grooves respectively opening to opposite side surfaces of said first and second cladding layers; forming an insertion groove in said first and second cladding layers and said waveguide substrate so that said insertion groove extends across said Y branch portion of said optical waveguide along said first and second wide grooves; and inserting a wavelength selecting filter into said insertion groove.

The first and second wide grooves may be replaced by first and second wide recesses formed on the opposite side surfaces of the waveguide substrate by cutting.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
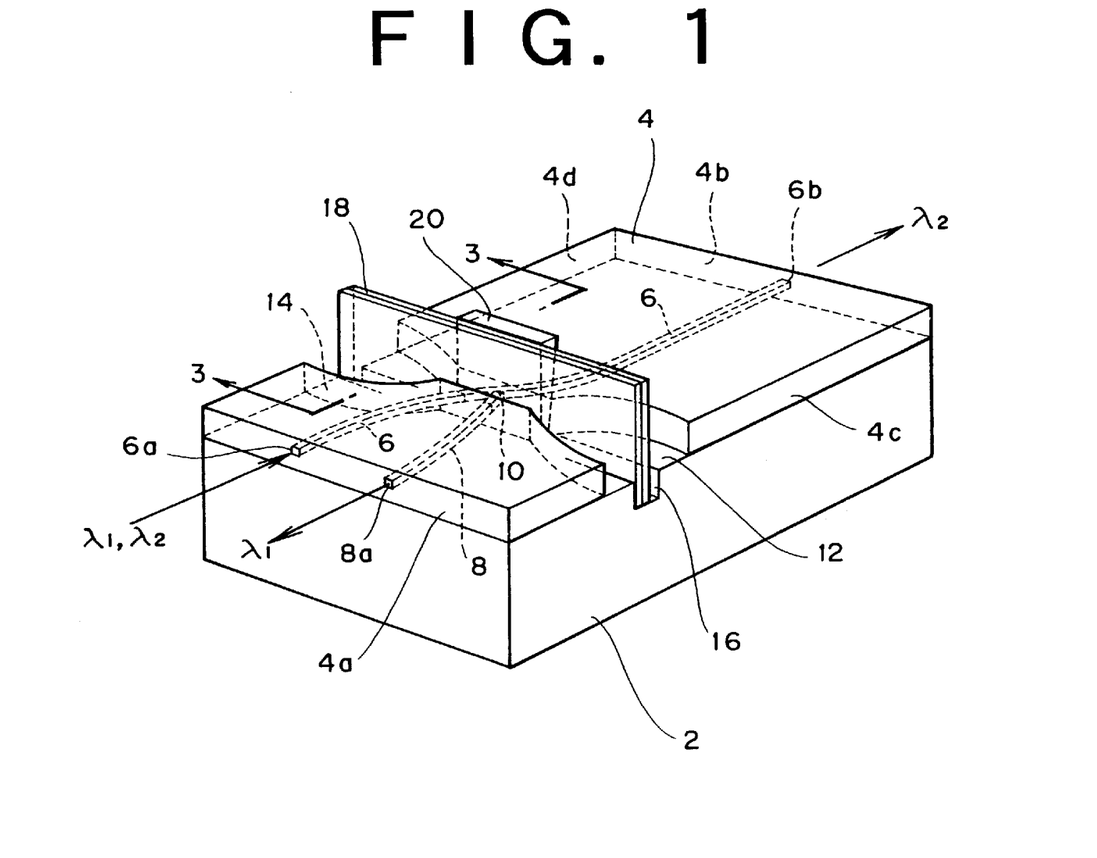
FIG. 1 is a perspective view of a first preferred embodiment of the present invention.
Figure 2:
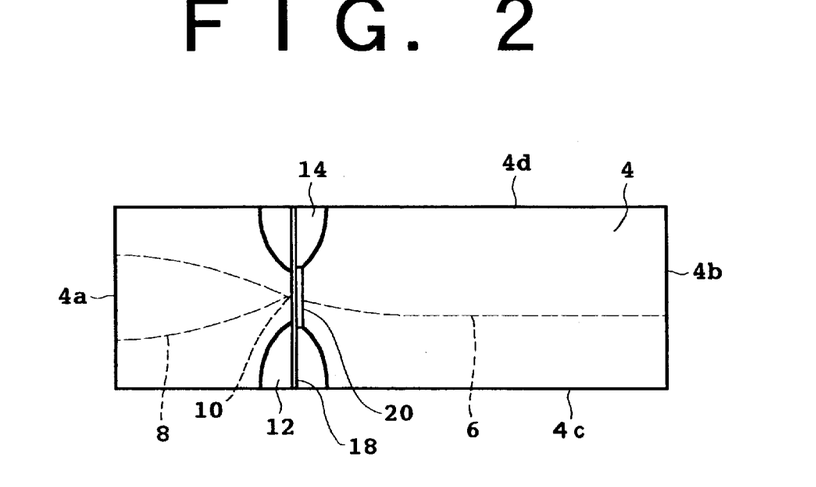
FIG. 2 is a plan view of the first preferred embodiment.

FIG. 1 is a perspective view of a wavelength division multiplexing optical device according to a first preferred embodiment of the present invention, and FIG. 2 is a plan view of the wavelength division multiplexing optical device shown in FIG. 1. An $SiO_2$ cladding layer 4 is formed on a silicon (Si) substrate 2. The cladding layer 4 is formed by depositing a layer of $SiO_2$ on the Si substrate 2 by CVD, for example. The cladding layer 4 has first and second end surfaces 4a and 4b and first and second side surfaces 4c and 4d.

A first optical waveguide 6 and a second optical waveguide 8 are embedded in the cladding layer 4. The first and second optical waveguides 6 and 8 are formed of $SiO_2$ doped with $TiO_2$, for example. The first optical waveguide 6 and the second optical waveguide 8 are connected together at a Y branch portion 10. The first optical waveguide 6 has a first end surface 6a exposed to the first end surface 4a of the cladding layer 4 and a second end surface 6b exposed to the second end surface 4b of the cladding layer 4. The second optical waveguide 8 has an end surface 8a exposed to the first end surface 4a of the cladding layer 4.

The cladding layer 4 is formed with first and second wide grooves 12 and 14 respectively opening to the first and second side surfaces 4c and 4d of the cladding layer 4. The first and second wide grooves 12 and 14 are formed by partially removing the $SiO_2$ cladding layer 4 by reactive ion etching, for example. As best shown in FIG. 2, the wide grooves 12 and 14 are so formed as to be gradually widened toward the first and second side surfaces 4c and 4d of the cladding layer 4, respectively.

An insertion groove 16 is formed in the Si substrate 2 and the $SiO_2$ cladding layer 4 so as to extend between the opposite side surfaces of the Si substrate 2 and pass across the Y branch portion 10 of the first and second optical waveguides 6 and 8 along the first and second wide grooves 12 and 14. The insertion groove 16 is formed by using a dicing saw, for example, and has a width of about 25 $\mu$m.

A dielectric multilayer film filter 18 is inserted in the insertion groove 16. Since the widths of the first and second wide grooves 12 and 14 are gradually decreased toward their inside, the dielectric multilayer film filter 18 can be easily inserted into the insertion groove 16 by first inserting the filter 18 into one of the wide grooves 12 and 14 and next guiding the filter 18 toward a central portion of the insertion groove 16 where the Y branch portion 10 of the first and second optical waveguides 6 and 8 is present.

Figure 3:
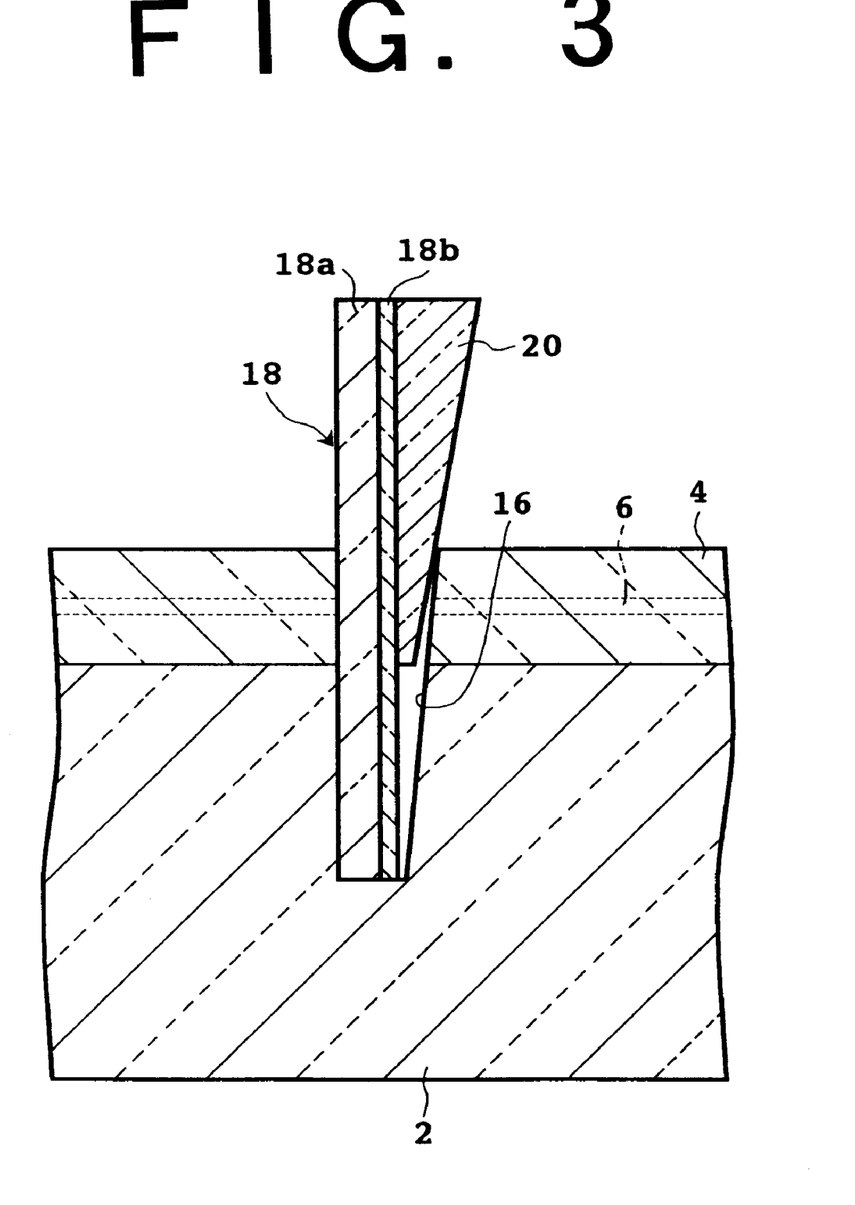
FIG. 3 is a cross section taken along the line 3—3 in FIG. 1.

Referring to FIG. 3, there is shown a cross section taken along the line 3—3 in FIG. 1. The width of the insertion groove 16 is generally larger than the thickness of the dielectric multilayer film filter 18. For example, the insertion groove 16 has a width of about 25 $\mu$m, and the dielectric multilayer film filter 18 has a thickness of about 15 $\mu$m. Accordingly, there is a possibility that the dielectric multilayer film filter 18 formed by laminating a plurality of dielectric films 18a on a substrate 18b may be inclined to the first and second optical waveguides 6 and 8 in a vertical plane in the condition that the filter 18 is inserted in the insertion groove 16. To eliminate this possibility, this preferred embodiment employs a wedge 20 driven into the insertion groove 16 to press the dielectric multilayer film filter 18 on a vertical wall surface defining the insertion groove 16.

Accordingly, the dielectric multilayer film filter 18 can be positioned in substantially perpendicular relationship to the optical waveguides 6 and 8, thereby suppressing an increase in insertion loss. Naturally, the wedge 20 is formed of a transparent material capable of transmitting light propagating in the optical waveguides 6 and 8, such as synthetic resin.

Of signal light having wavelengths $\lambda 1$ and $\lambda 2$ entered the first optical waveguide 6 from its first end surface 6a, the signal light having the wavelength $\lambda 2$ is passed through the dielectric multilayer film filter 18 and emerged from the second end surface 6b of the first optical waveguide 6. On the other hand, the signal light having the wavelength $\lambda 1$ is reflected by the dielectric multilayer film filter 18, coupled to the second optical waveguide 8, and emerged from the end surface 8a of the second optical waveguide 8. For example, $\lambda 1=1.55$ $\mu$m and $\lambda 2=1.3$ $\mu$m.

While the two wide grooves 12 and 14 are formed so as to open to the opposite side surfaces 4c and 4d of the cladding layer 4 in the first preferred embodiment mentioned above, one wide groove may be formed so as to open to one of the opposite side surfaces 4c and 4d for the purpose of easy insertion of the filter 18 into the insertion groove 16.

Figure 4A:
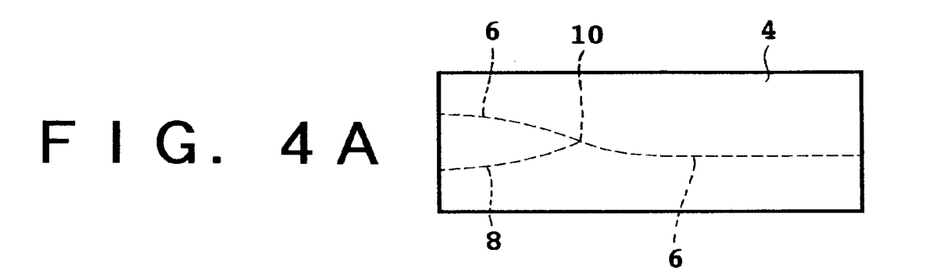
FIGS. 4A to 4D are plan views showing a manufacturing process for the first preferred embodiment of the present invention.
Figure 4B:
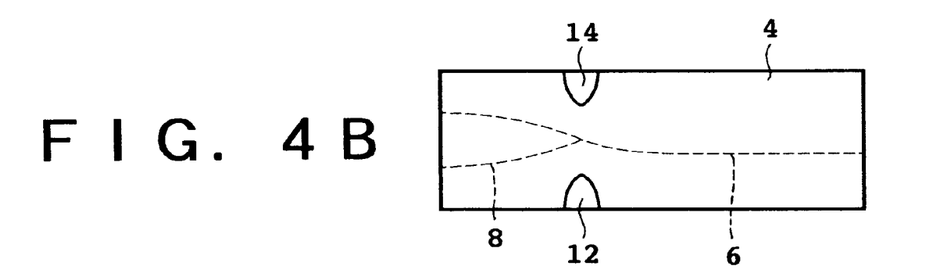

A manufacturing process for the first preferred embodiment of the present invention will now be described with reference to FIGS. 4A to 4D. As shown in FIG. 4A, the first and second optical waveguides 6 and 8 embedded in the $SiO_2$ cladding layer 4 are formed in the first step. The first and second optical waveguides 6 and 8 are connected together at the Y branch portion 10.

Figure 5A:
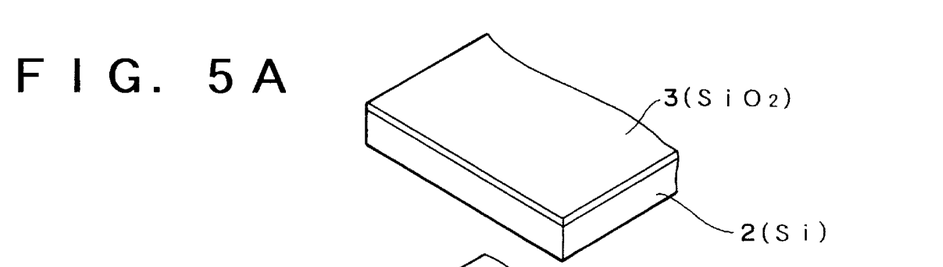
FIGS. 5A to 5D are perspective views showing a forming process for optical waveguides.
Figures 5B, 5C:
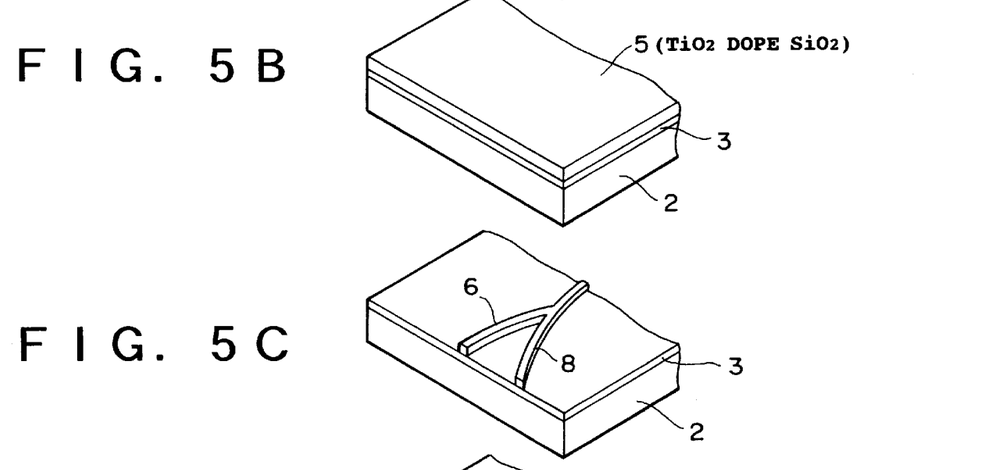
Figure 5D:
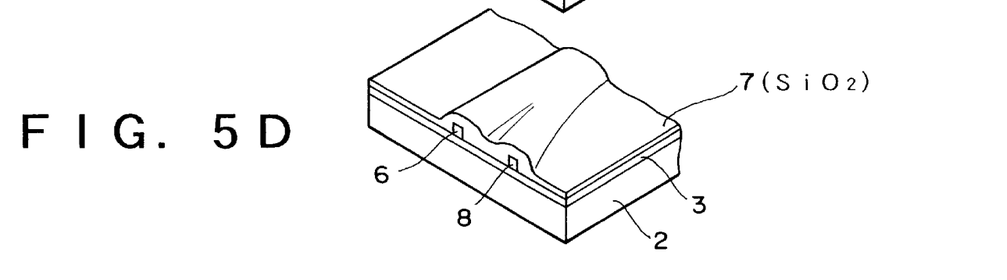

This forming process for the optical waveguides 6 and 8 will now be described in detail with reference to FIGS. 5A to 5D. As shown in FIG. 5A, a first $SiO_2$ cladding layer 3 is first formed on the Si substrate 2 by CVD or sputtering, for example. As shown in FIG. 5B, an $SiO_2$ layer doped with $TiO_2$ as a waveguide layer 5 is next formed on the first cladding layer 3 by CVD or sputtering, for example. As shown in FIG. 5C, an unrequired portion of the waveguide layer 5 is next removed by etching to form the first and second optical waveguides 6 and 8. As shown in FIG. 5D, a second $SiO_2$ cladding layer 7 is finally formed on the first cladding layer 3 so as to cover the first and second optical waveguides 6 and 8 by CVD or sputtering, for example.

Figure 4C:
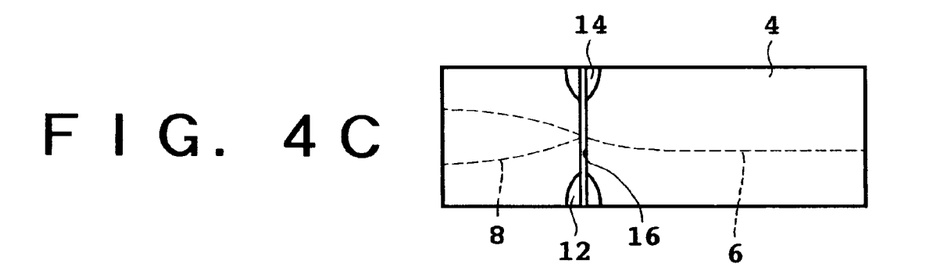

Referring back to FIG. 4B, the opposite side surfaces of the $SiO_2$ cladding layer 4 are partially removed by reactive ion etching, for example, at a position where the insertion groove 16 is to be formed later, thereby forming the wide grooves 12 and 14 whose widths are gradually increased toward the outside. As shown in FIG. 4C, the insertion groove 16 for receiving the dielectric multilayer film filter 18 is next formed by using a dicing saw or the like in such a manner as to extend across the Y branch portion 10 along the wide grooves 12 and 14.

Figure 4D:
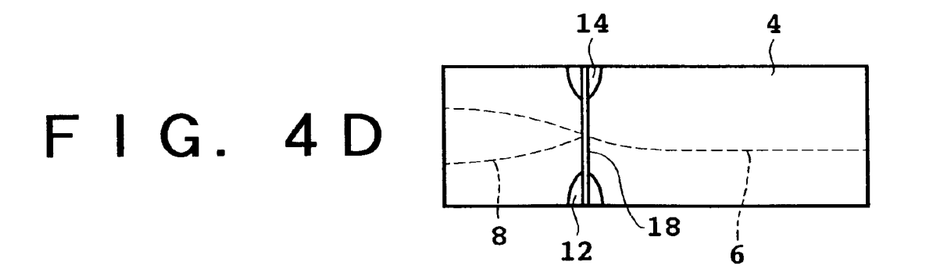

As shown in FIG. 4D, the dielectric multilayer film filter 18 is finally inserted into the insertion groove 16 by utilizing one of the wide grooves 12 and 14 as a guide. Although not especially shown, the wedge 20 may be driven into the insertion groove 16 after the step shown in FIG. 4D.

Figures 6A, 6B:
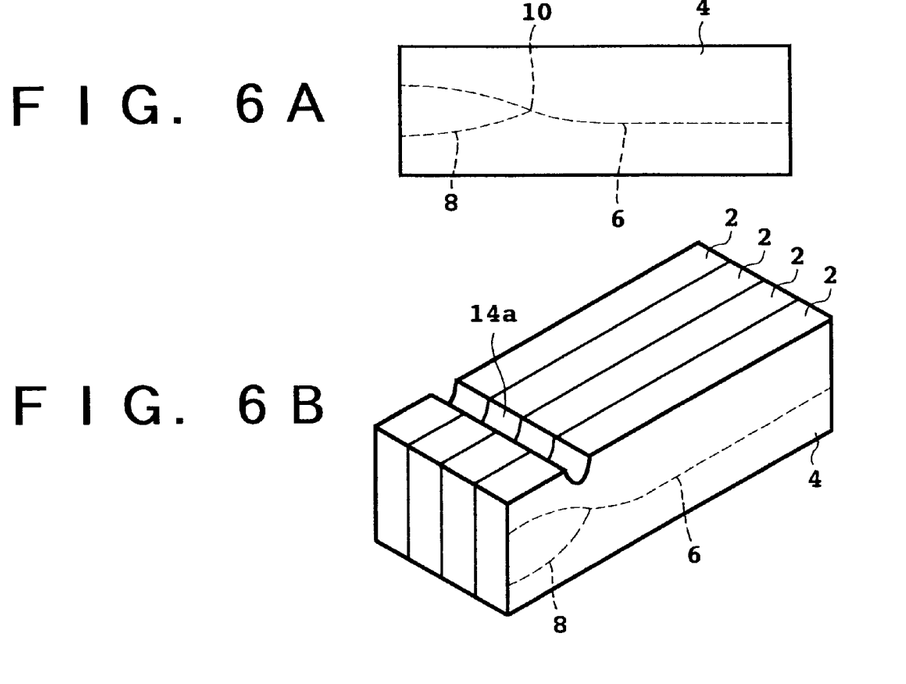
FIGS. 6A to 6D are views showing a manufacturing process for a second preferred embodiment of the present invention.
Figure 6C:
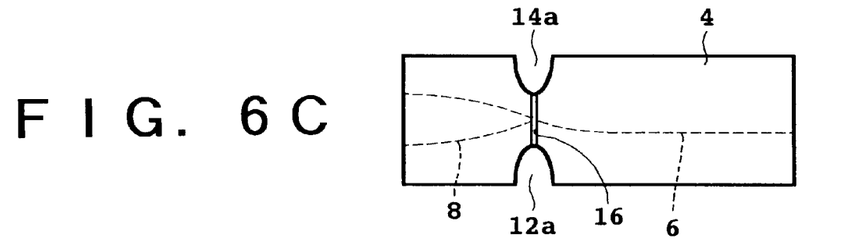
Figure 6D:
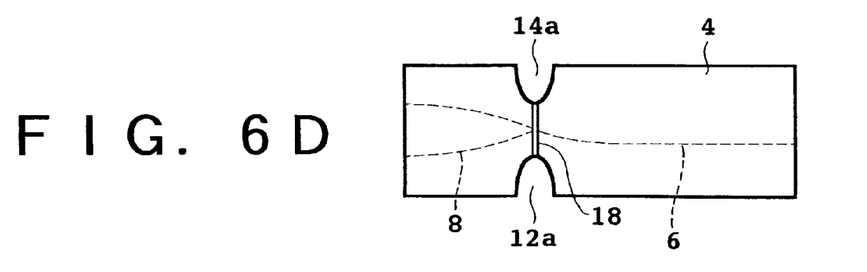

Referring to FIGS. 6A to 6D, there is shown a manufacturing process for a second preferred embodiment of the present invention. This manufacturing process is different from the manufacturing process for the first preferred embodiment shown in FIG. 4A to 4D in the step of forming a wide groove or recess shown in FIG. 6B. The other steps are similar to those of the manufacturing process for the first preferred embodiment. In the manufacturing process for the second preferred embodiment, as shown in FIG. 6B, a plurality of waveguide substrates 2 with cladding layers 4 each formed with optical waveguides 6 and 8 are raised and arranged in alignment, and a plurality of grooves or recesses 14a are formed on the same side surfaces of the waveguide substrates 2 with cladding layers 4 by using a dicing saw or the like. Similarly, a plurality of grooves or recesses 12a are formed on the other same side surfaces of the waveguide substrates 2 with cladding layers 4.

Figure 7A:
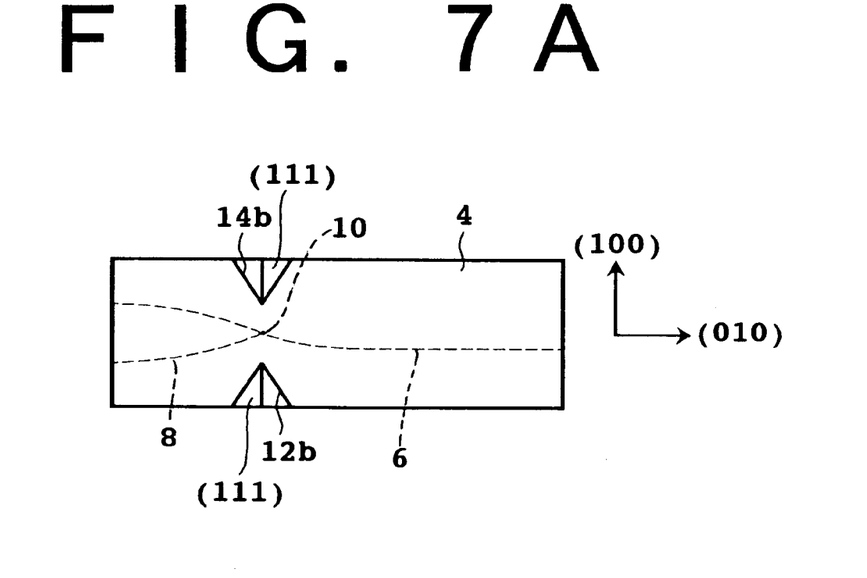
FIGS. 7A and 7B are a plan view and an elevational view, respectively, showing another manufacturing method for wide grooves.
Figure 7B:
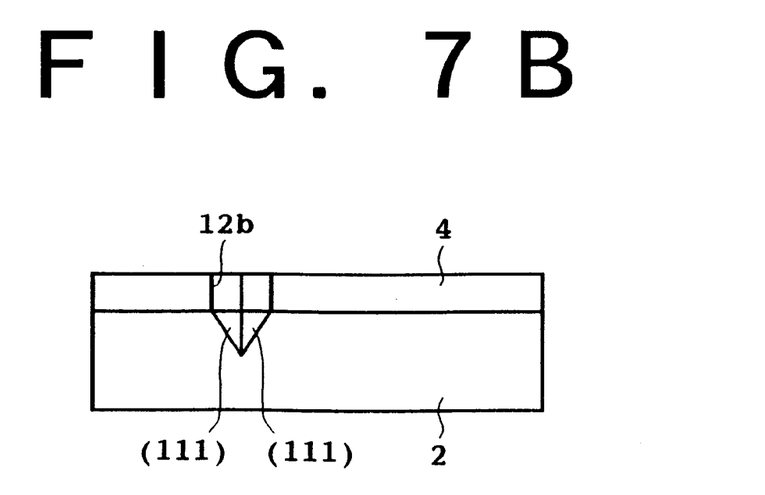

FIGS. 7A and 7B are a plan view and an elevational view, respectively, showing another manufacturing method for the wide grooves. In this manufacturing method, wide V-shaped grooves 12b and 14b are formed by etching the silicon substrate 2. By setting the crystal orientation (i.e., planes 100, 010, and 111) of the silicon substrate 2 as shown in FIG. 7A and carrying out anisotropic etching using KOH, the (111) plane of the silicon substrate 2 can be exposed into the V-shaped grooves 12b and 14b.

Figure 8A:
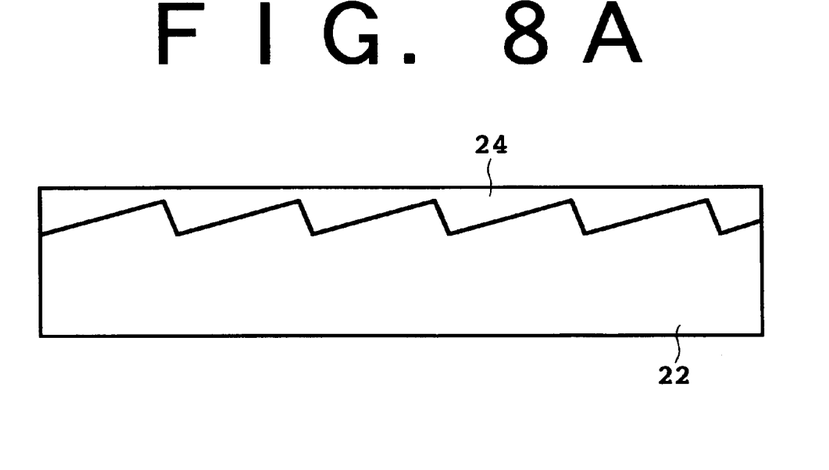
FIGS. 8A to 8C are views showing a manufacturing process for wedges.
Figure 8B:
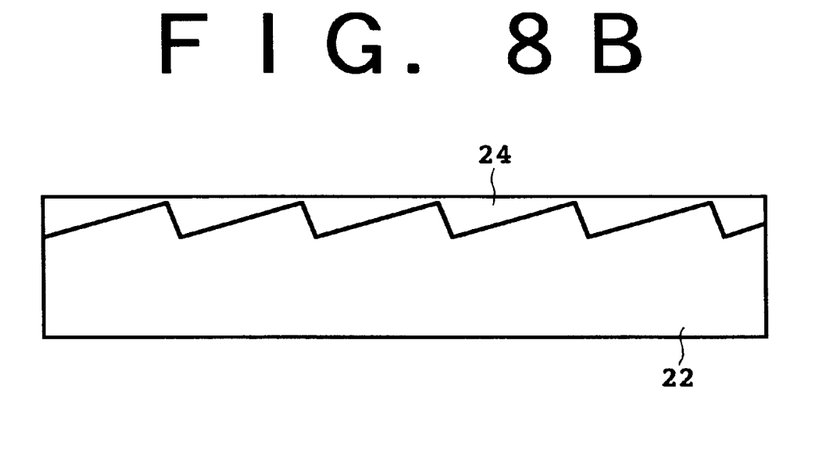
Figure 8C:
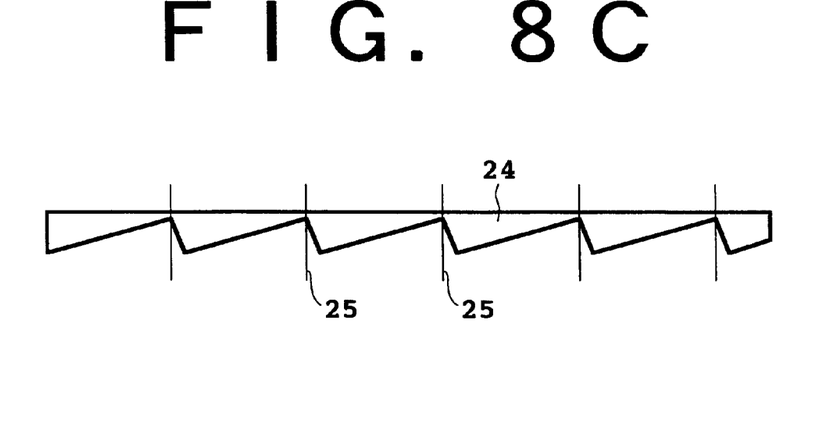

FIGS. 8A to 8C show a manufacturing process for the wedge. As shown in FIG. 8A, a sawtooth structure as a mold is first formed on a substrate 22 by cutting or etching, and a polyimide solution 24 is next applied to the sawtooth structure. The polyimide solution 24 is next cured to form an array of wedge-shaped polyimide resin members 24 connected together as shown in FIG. 8B. These connected resin members 24 are next cut along lines 25 shown in FIG. 8C to obtain a plurality of individual wedges 20 as shown in FIG. 3.

Figure 9:
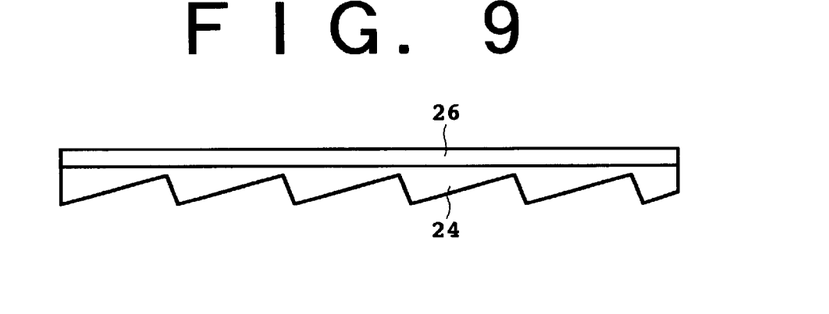
FIG. 9 is a view showing a combined filter and wedge array.
Figure 10:
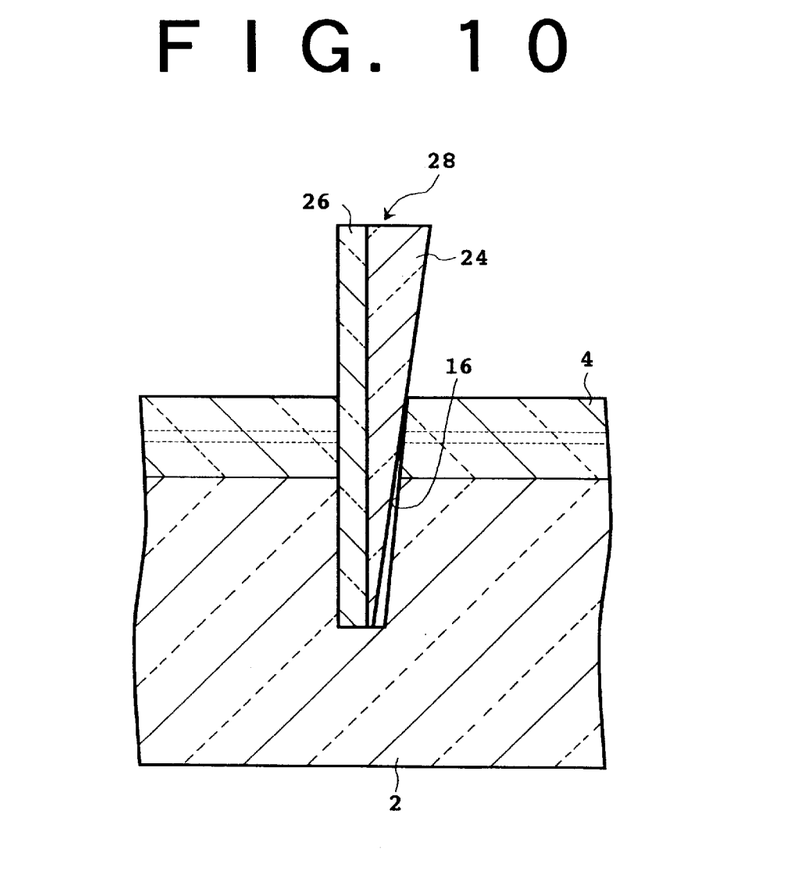
FIG. 10 is a sectional view of a third preferred embodiment of the present invention.

Referring to FIG. 9, there is shown a combined filter and wedge array according to a third preferred embodiment of the present invention. The combined filter and wedge array is formed by vapor deposition of a dielectric multilayer film structure 26 of $TiO_2/SiO_2$, for example, on the array of wedge-shaped polyimide resin members 24 shown in FIG. 8C. By cutting the combined filter and wedge array obtained above into individual pieces along lines similar to the lines 25 shown in FIG. 8C, a combined filter and wedge 28 as shown in FIG. 10 can be obtained. Accordingly, by inserting the combined filter and wedge 28 into the insertion groove 16, a structure similar to that shown in FIG. 3 can be easily provided in a single step.

Figure 11A:
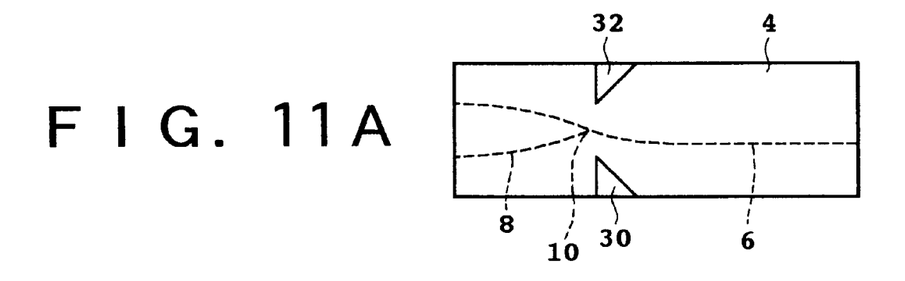
FIGS. 11A to 11C are plan views showing a manufacturing process for a fourth preferred embodiment of the present invention.
Figure 11B:
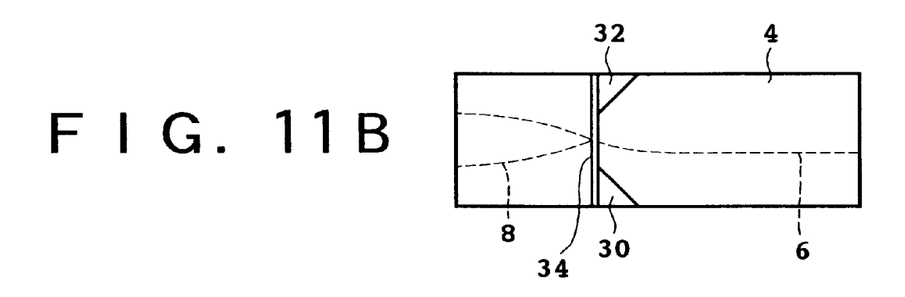

FIGS. 11A to 11C show a manufacturing process for a fourth preferred embodiment of the present invention. As shown in FIG. 11A, the opposite side surfaces of the $SiO_2$ cladding layer 4 are partially removed by etching to form triangular grooves 30 and 32. One side of each of the triangular grooves 30 and 32 is perpendicular to the corresponding side surface of the cladding layer 4. As shown in FIG. 11B, an insertion groove 34 is formed in such a manner that its one side coincides with one side of each of the triangular grooves 30 and 32. With this structure, the other side of the insertion groove 34 is made continuous between the cladding layer 4 and the silicon substrate 2 over the width thereof.

Figure 11C:
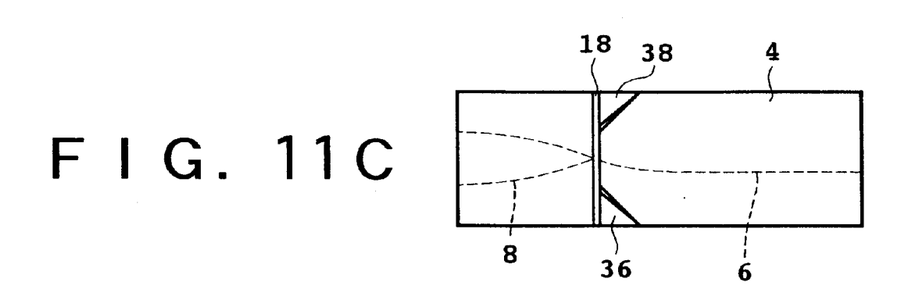

As shown in FIG. 11C, the filter 18 is inserted into the insertion groove 34. Since the widths of the triangular grooves 30 and 32 are gradually increased toward the outside, the filter 18 can be easily inserted into the insertion groove 34 as being guided by the triangular groove 30 or 32. Further, two wedges 36 and 38 are substantially horizontally driven into the triangular grooves 30 and 32, respectively, from the outside thereof, thereby pressing the filter 18 on the continuous other side of the insertion groove 34 and accordingly maintaining the filter 18 substantially perpendicular to the optical waveguides 6 and 8 in a vertical plane.

Figure 12:
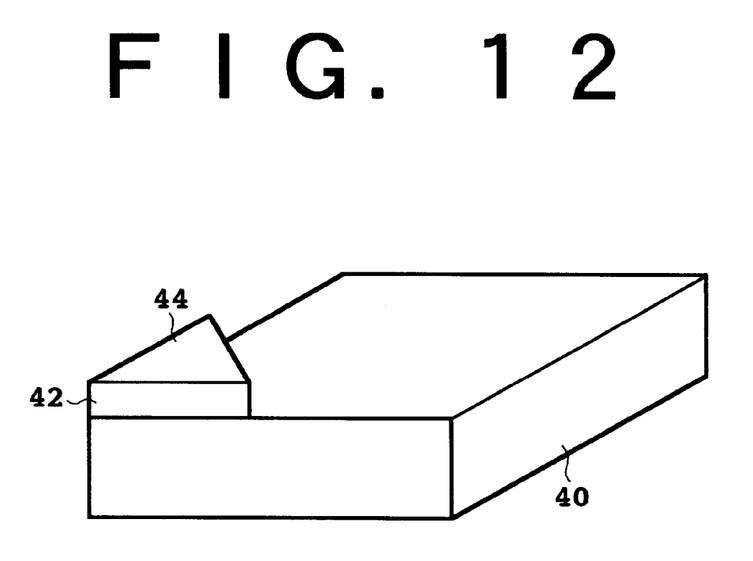
FIG. 12 is a perspective view of a wedge usable in the fourth preferred embodiment.

An example of such wedges 36 and 38 is shown in FIG. 12. A wedge 44 is formed by first forming an $SiO_2$ layer 42 on an Si substrate 40 by CVD, for example, and next removing an unrequited portion of the $SiO_2$ layer 42 by etching. The wedge 44 can be driven into the triangular groove 30 by turning the condition shown in FIG. 12 upside down and next sliding the substrate 40 on the $SiO_2$ cladding layer 4.

Having thus described various preferred embodiments of the present invention, the shapes of the wide grooves are not limited to those shown, but any other shapes that can easily guide the filter may be adopted. Further, the waveguide substrate is not limited to a silicon substrate, but any other substrates such as a glass substrate may be adopted. In addition, the optical waveguides may be formed of any other materials such as polymer.

According to the present invention, it is possible to provide a wavelength division multiplexing optical device which can facilitate a filter insertion step. Further, by driving a wedge into the insertion groove, the filter can be maintained substantially perpendicular to the optical waveguides, thereby reducing insertion loss of light.

What is claimed is:

1. A wavelength division multiplexing optical device comprising:

a waveguide substrate;

a cladding layer formed on said waveguide substrate, said cladding layer having first and second end surfaces and first and second side surfaces;

a first optical waveguide embedded in said cladding layer;

a second optical waveguide embedded in said cladding layer and connected at one end thereof to an intermediate portion of said first optical waveguide;

an insertion groove formed in said waveguide substrate and said cladding layer between said first side surface and said second side surface so as to extend across a connected portion of said first and second optical waveguides;

a wide groove formed in at least said cladding layer so as to cover one end portion of said insertion groove and open to one of said first and second side surfaces;

a wavelength selecting filter inserted in said insertion groove; and a wedge adapted to be driven into said insertion groove, for pressing said wavelength selecting filter on a wall surface of said insertion groove.

2. A wavelength division multiplexing optical device according to claim 1, wherein said wavelength selecting filter is wedge-shaped.

3. A wavelength division multiplexing optical device according to claim 1, wherein said wide groove is triangular, and said device further comprises first and second wedges substantially horizontally driven into said wide groove from said first and second side surfaces, respectively, for pressing said wavelength selecting filter on a wall surface of said insertion groove.

4. A manufacturing method for a wavelength division multiplexing optical device, comprising the steps of:

forming a first cladding layer on a waveguide substrate;

forming a waveguide layer on said first cladding layer;

etching said waveguide layer to form an optical waveguide having a Y branch portion;

forming a second cladding layer on said first cladding layer so as to cover said optical waveguide;

etching said first and second cladding layers to form first and second wide grooves respectively opening to opposite side surfaces of said first and second cladding layers;

forming an insertion groove in said first and second cladding layers and said waveguide substrate so that said insertion groove extends across said Y branch portion of said optical waveguide along said first and second wide grooves;

inserting a wavelength selecting filter into said insertion groove; and driving a wedge into said insertion groove.

5. A manufacturing method for a wavelength division multiplexing optical device, comprising the steps of:

forming a first cladding layer on a waveguide substrate;

forming a waveguide layer on said first cladding layer;

etching said waveguide layer to form an optical waveguide having a Y branch portion;

forming a second cladding layer on said first cladding layer so as to cover said optical waveguide;

cutting opposite side surfaces of said waveguide substrate to form first and second recesses;

forming an insertion groove in said first and second cladding layers and said waveguide substrate so that said insertion groove extends across said Y branch portion of said optical waveguide between said first and second recesses;

inserting a wavelength selecting filter into said insertion groove; and driving a wedge into said insertion groove.

* * * * *